Figure 1:
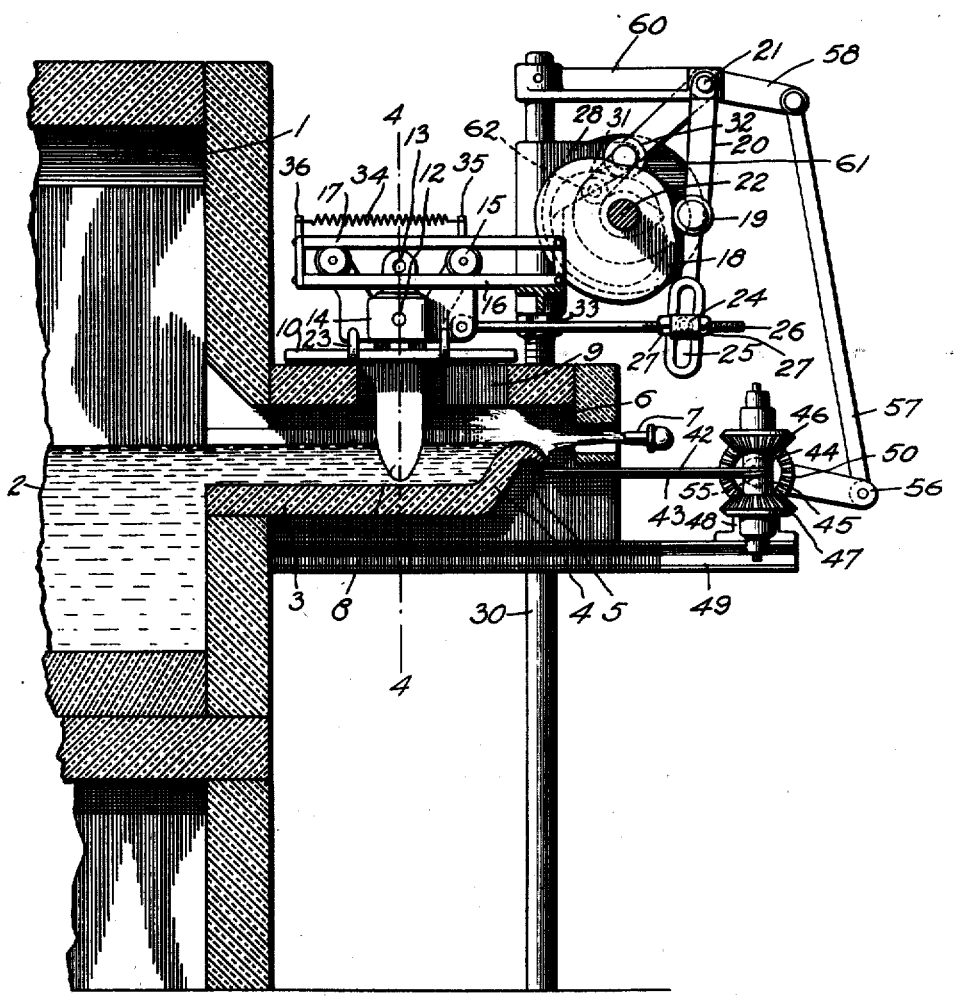

K. E. PEILER.
FEEDER FOR MOLTEN GLASS.
APPLICATION FILED AUG. 6, 1912. RENEWED NOV. 28, 1916.

1,277,254.

Patented Aug. 27, 1918.
4 SHEETS—SHEET 1.

Witnesses:

Inventor:
Karl E. Peiler
by W. H. Honiss
Atty.

K. E. PEILER.
FEEDER FOR MOLTEN GLASS.
APPLICATION FILED AUG. 6, 1912. RENEWED NOV. 28, 1916.
1,277,254.
Patented Aug. 27, 1918.
4 SHEETS—SHEET 3.
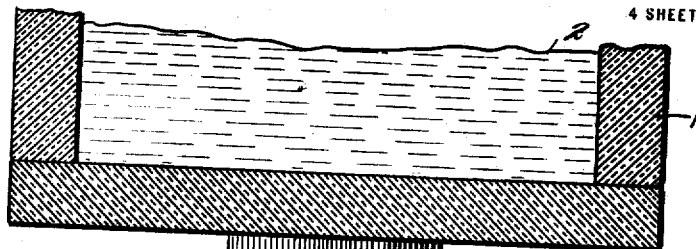
Fig. 3.
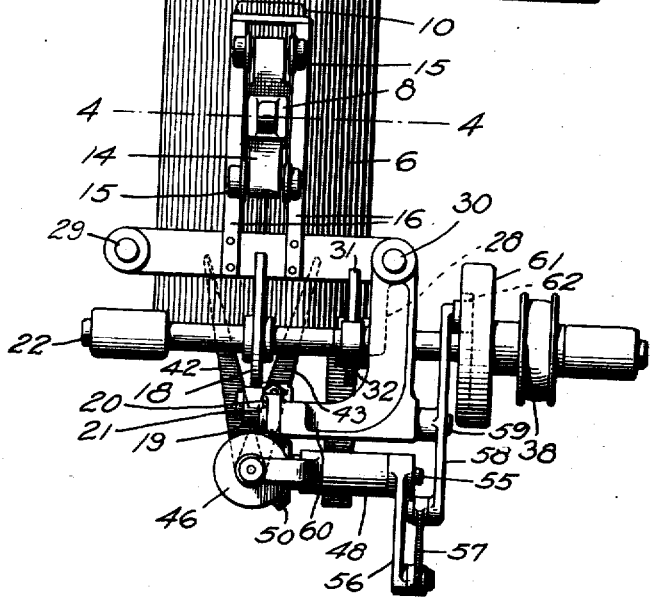
Fig. 4.
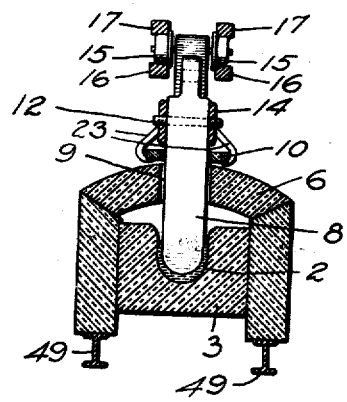
Witnesses:
Inventor:
Karl E. Peiler
by
Atty K. E. PEILER.
FEEDER FOR MOLTEN GLASS.
APPLICATION FILED AUG. 6, 1912. RENEWED NOV. 28, 1916.
1,277,254.
Patented Aug. 27, 1918.
4 SHEETS—SHEET 4.
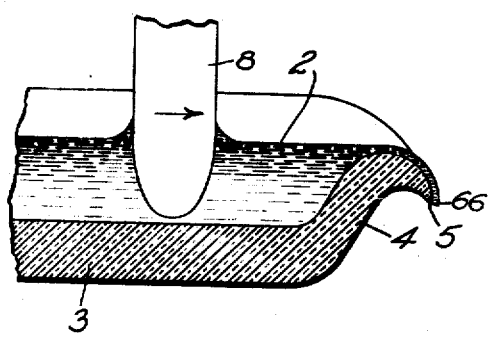
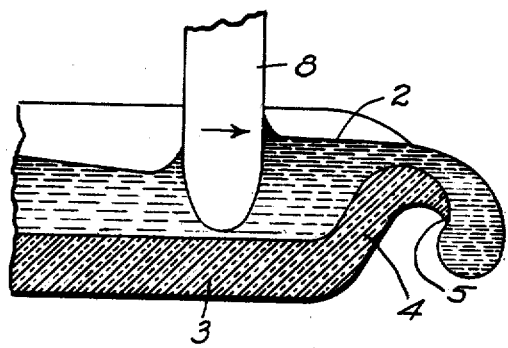
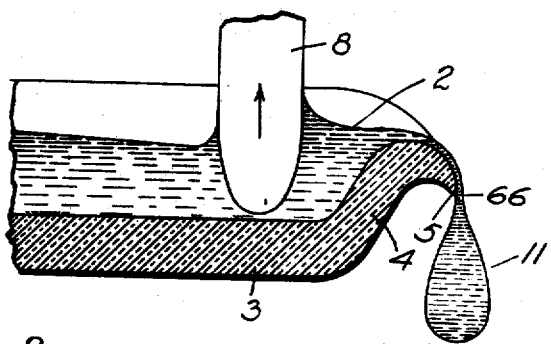
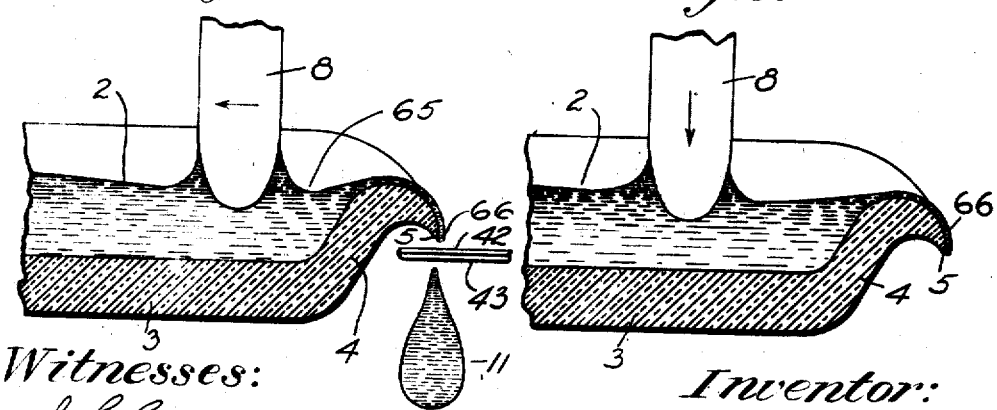
Witnesses:
Inventor:
Karl E. Peiler
by W. H. Honiss
Atty.

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

FEEDER FOR MOLTEN GLASS.

1,277,254.   Specification of Letters Patent.   Patented Aug. 27, 1918.

Application filed August 6, 1912, Serial No. 713,538. Renewed November 28, 1916. Serial No. 133,995.

*To all whom it may concern:*

Be it known that I, KARL E. PEILER, a citizen of the United States, residing at Hartford, in the county of Hartford and State of Connecticut, have invented new and useful Improvements in Feeders for Molten Glass, of which the following is a specification.

The object of this invention is to provide simple, effective and convenient means for separating and feeding molten glass in uniform masses or drops, and at uniform intervals of time to glass shaping molds or to other devices or for other purposes for which such uniform separating and feeding of molten glass is desirable.

The problem of separating molten glass into uniform masses and delivering them smoothly and free from threads in regular and reliable succession at predetermined intervals of time is especially difficult because of the viscosity and other peculiar properties and characteristics of molten glass, whereby it adheres tenaciously to feeding or gathering implements unless the latter are kept cool, in which case they are liable to injuriously chill the glass. The separation of molten glass into drops or masses tends to draw it more or less unequally and irregularly into threads, which chill quickly and thus further increase the difficulty of separating the masses uniformly and maintaining them in the uniformly heated and plastic condition which is essential for pressing or blowing or otherwise shaping the glass to best advantage.

In the present invention, these difficulties are overcome by flowing the molten glass from a melting tank or furnace or other source of supply through and from an outlet in a succession of waves or surges, propagated by means of a sweep of refractory material which is moved back and forth through the glass, sweeping the required mass of glass past the outlet on its advance stroke and preferably making its return stroke in a different path. The outlet preferably terminates with a low wall or dam, over which the glass in front of the sweep is pushed by the sweep in waves or surges, which settle down on the outer side of the dam in drops or globules which may be made to take a pear shaped form, suspended for the moment from the outlet by an attenuating thread of the glass. For some purposes, the weight of the suspended glass may be relied upon to sever its suspending thread. But where uniformity, and especially rapidity of action is required, it is preferable to provide other means, shown herein as shear blades, for severing the suspending thread at the required periods. The suspended end of the severed thread of glass, relieved from the weight, is retracted by its own inherent tendencies, aided by its continued connection with the succeeding wave of glass, which as the sweep is moved back for the next instalment of glass sinks down on the inside of the dam, thus tending to draw the thread back over the dam, and thereby reincorporating it with the glass with which it remains connected. This incorporation or absorption is preferably aided by heat from a jet or flame, which plays upon the outlet, and thus serves to maintain the glass and the threads at a temperature which keeps them in uniformly plastic condition.

Figure 2:
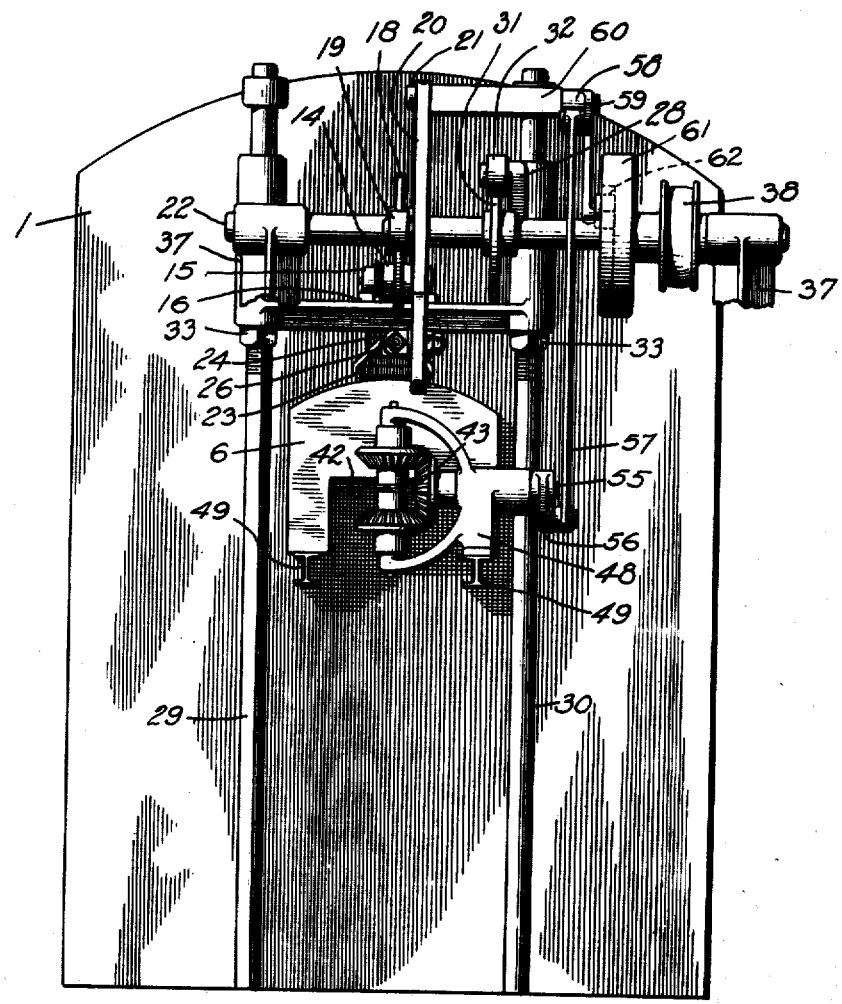

Figure 1 of the drawings is a side view of a preferred embodiment of this invention, shown in connection with a glass melting tank or furnace, which is shown in section taken approximately along its longitudinal center. Fig. 2 is a front view projected from Fig. 1. Fig. 3 is a plan view projected from Figs. 1 and 2, and Fig. 4 is a front view in section taken on the lines 4—4 of Figs. 1 and 3. The upper rails for the carriage are omitted in Figs. 2 and 3, to enable other parts to be shown more clearly.

Figs. 5 to 9 inclusive are side views in section taken approximately through the longitudinal center of the conduit, showing in enlarged scale the successive positions of the sweep, and thus illustrating the steps of its resulting operation.

The glass melting tank or furnace 1 containing a supply of molten glass 2 is provided with an outlet herein shown as a conduit 3, into and along which the glass flows from the tank, and is maintained at approximately uniform level, either as a result of the operations of a so-called continuous melting tank, or by other wellknown means or methods. The discharging end of the conduit preferably terminates in a low wall or dam 4, the top of which is approximately at the normal level of the glass in the conduit, as shown in Fig. 1, the outer side of the wall or dam being provided with a depending apron or lip 5 to carry the glass clear of the end of the conduit. The conduit is preferably inclosed by a hood 6 to retain the heat, which may be augmented by a jet or flame of gas from one or more nozzles 7.

The molten glass is impelled toward the end of the conduit and over the dam in successive waves or surges, each containing the required volume of glass for the desired drop, propagated by means of a sweep 8 of refractory material, which projects from above into the glass, and is carried forward and back therein, as illustrated in Figs. 5 to 9 inclusive, the forward and backward movements of the sweep being preferably made in different paths, especially when working in a conduit, so that the sweep upon its return stroke passes over or by some of the forward flowing glass. The hood is slotted at 9 to allow the sweep 8 to project through it into the conduit and to move through its desired path. The slot 9 is preferably covered by a shield 10, which is secured to the carriage 14 by means of suitable clamps 23. This shield prevents undue loss of heat through the slot, and protects the adjacent carriage and other mechanism from that heat.

The sweep 8 is supported by a carriage 14 by means of which it is carried longitudinally back and forth along the conduit. The carriage is shown to be provided with anti-friction wheels 15, preferably four in number, which roll between the rails 16 and 17, thereby guiding the carriage in its longitudinal movement, which is imparted by means of a cam 18 upon the cam shaft 22, acting upon the pin or roller 19 appurtenant to the cam arm 20, which is pivoted at 21 and has upon its lower end a slotted and swiveling connection with a rod 26 connected to the carriage 14. The swiveling connection 24 is adjustably clamped in the slot 25 of the cam arm 20, and may be raised or lowered thereon to shorten or lengthen the path of movement of the sweep, and the rod 26 passes through the swivel joint and is provided with nuts 27, by means of which the connection with the carriage 14 may be lengthened or shortened, thus correspondingly changing the lengthwise position of its operating stroke or path, relative to the conduit, instead of or in addition to altering the amplitude of the stroke.

The carriage rails 16 are attached to and supported by a yoke 28, which is fitted for vertical sliding movement upon the rods or standards 29 and 30, which may extend upwardly from the base of the machine or be supported in any convenient way. Rising and falling movement, when required, is imparted to the yoke 28, and consequently to its carriage 14, by means of a cam 31, upon the cam shaft 22 engaging with the pin or roller 32 upon the yoke 28. The cam 31 determines the height to which the sweep 8 is lifted, preferably avoiding lifting the sweep entirely out of the glass. The limit of the downward stroke is determined by nuts 33 on the rods or standards 29 and 30, which serve as stops for the yoke, and may be adjusted to vary the lower active position of the sweep. The cams 18 and 31 are herein shown to be open cams, which therefore act positively in only one direction, the return movement of the carriage 14 being in this case caused by the tension spring 34 attached between two posts 35 and 36, the former of which is attached to the carriage and the latter to the carriage rails. The weight of the carriage 14 and its supporting yoke 28 are relied upon for causing the downward movement of the carriage when permitted by the cam 31; but cams having closed paths may obviously be employed whenever preferable.

The cam shaft 22 is herein shown to be supported near its ends by the brackets 37, extending from any convenient frame or support. Rotary movement is imparted to the shaft by means of a belt from any convenient source of power applied to the pulley 38 or in any other convenient way, in synchronism with the movements of the press or other machine with which the feeder may be employed.

The severing mechanism herein shown consists of a pair of shear blades 42 and 43 attached to the hubs or collars 44 and 45 of the bevel gears 46 and 47, respectively, those gears being journaled for turning movement upon arms of the bracket 48 supported upon the I-beam 49. The bevel gears 46 and 47 mesh with the driving bevel gear 50, fixed upon one end of the shaft 55, which is journaled in the bracket 48, and has fixed upon its opposite end an arm 56 connected by the rod 57 with a bell-cranked arm 58, which is pivotally mounted at 59 upon a supporting arm or bracket 60 extending from the standard 30. The other end of the bell-cranked arm 58 engages by means of a pin or roll 62 with a cam path in the side of the cam 61, also fixed upon the cam shaft 22.

The sweep of refractory material is preferably removably attached to the carriage 14, being connected therewith by means of the pin 12, or by means of any suitable holding or clamping connections. The upper end of the sweep is here shown to be provided with an eye 13, to receive the end of a hook, by which the sweep may be removed from the carriage upon removal of the pin 12, or by loosening the clamping or other holding means.

In the operation of this mechanism, the sweep 8 starting from its retracted and lower position illustrated in Fig. 5 is moved forward through the position shown in Fig. 6 to that of Fig. 7, pushing before it a suitable quantity of glass, which surges over the dam 4 and settles down as shown in Fig. 7 in the form of a drop or globule 11, the suspending thread 66 of which is then severed by the shear blades 42 and 43, as illustrated in Fig. 8. Meanwhile, the sweep has been raised, thus allowing the glass in front of it to sink down at 65, behind the dam, and thereby stopping the further flow of glass over the dam and serving to retract the glass and thus attenuate the connecting thread 66. The heat confined by the inclosed hood 6, augmented when necessary by the flame from a gas jet 7, maintains the glass in plastic condition, so that the stub of thread is more or less reabsorbed into and incorporated with the succeeding wave of glass to be brought forward by the next active stroke of the sweep. Having thus delivered a drop or mass of glass, the sweep moves back in the direction of the arrow shown in Fig. 8 to its retracted position shown in Fig. 9, from which it is then moved downwardly to the position shown in Fig. 5, thus getting behind another quantity of glass which meanwhile has flowed forward to fill up the depression left in front of the sweep by the discharge of the previous wave. The arrows shown upon the sweep in Figs. 5, 6, 7, 8 and 9 indicate the direction of the next movement of the sweep from the respective positions shown in these figures, these movements, being imparted by means of the cams 18 and 31 acting upon the carriage 14 and its raising and lowering yoke 28 already described.

The severed drops of glass may be delivered to the molds or other receptacles for which they are intended, either by falling directly into the molds, or by falling upon a chute or conveyer, by which the drops are transported to their destination. The length of the conduit may be proportioned and disposed so as to deliver the drops at the desired location. Or it may be short, projecting from the tank or other receptacle for the glass only far enough to form a lip to hold the suspended drops free from the side of the tank or container and prevent them from dripping down the side. In this case, the stroke of the sweep may extend backwardly into the tank, or into a pool of glass. In such an arrangement the sweep may be moved forward and back in the same path, since the glass is enabled to flow in front of the sweep from the sides of the path of movement of the sweep, when the latter is in its backward position.

The upper guard rail 17 may be omitted as shown in Figs. 2 and 3 by making the carriage sufficiently heavy, or otherwise providing for holding it down upon the lower rails 16, to prevent it from being tilted by the resistance of the glass.

The mechanism which is here shown to be supported upon standards or arms adjacent to or appurtenant to the furnace itself may be combined with or supported by the framing of the machine or other apparatus with which the feeder is to be employed. Thus in various ways which will be obvious to those familiar with this art, the features of this invention may be modified in various ways to suit different circumstances or conditions of service.

In my co-pending application, Serial Number 133948, filed as a division or continuation of this application, I have described and claimed processes which the apparatus of this application is adapted to perform.

I claim as my invention:—

1. In apparatus for feeding molten glass, the combination of a container for the glass, and means for propagating waves or surges of the glass in a regulated succession toward and over the side of the container.

2. Apparatus for feeding molten glass, including a conduit, a sweep of refractory material, means for supporting the sweep, with a portion thereof projecting into and remaining in the glass in the conduit, and means for moving the sweep back and forth along the conduit.

3. The combination, in feeders for molten glass, of a container for the glass, and means including a horizontally reciprocating sweep for propagating regulated waves or surges along the surface portion of the glass toward and over the side of the container.

4. Means for separating molten glass into mold charges including in combination a conduit for the glass, and a horizontally reciprocating sweep for propagating a regulated succession of waves or surges of the glass along the conduit.

5. The combination, in feeders for molten glass, of a conduit for the glass, and a sweep mounted for regulated movements in and horizontally along the conduit for discharging molten glass therefrom in separated and timed mold charges.

6. The combination, in feeders for molten glass, of a conduit for the glass, and a sweep mounted for movement horizontally along the conduit to advance a regulated succession of waves of the molten glass along the conduit and over the end thereof in a succession of mold charges.

7. Means for separating molten glass into mold charges, including a conduit for the glass, a sweep mounted for regulated reciprocating movement along the conduit to discharge waves of the molten glass therefrom, and coördinated means for severing the discharged waves of glass.

8. Means for separating molten glass into mold charges, including a conduit connected with a supply of glass and having a dam at its outlet, regulated reciprocating means projecting into and remaining in the glass for propagating timed waves or surges of the glass over the dam, and severing means coördinated with the wave propagating means for severing the successive masses of glass depending from the dam.

9. Means for separating molten glass into mold charges, including a conduit connected with a supply of glass and having a dam at its outlet, and regulated means for propagating successive timed surges of glass along the conduit toward and over the dam, and for drawing back the glass from the dam, after each surge has passed over the dam to attenuate the glass between the said surges.

10. The combination, in feeders for molten glass, of a conduit for the glass provided with a retaining dam for the glass, and a sweep mounted for regulated horizontal movement in the conduit to sweep the glass in successive regular masses toward and over the said dam.

11. The combination in feeders for molten glass, of an outflow conduit for the glass, provided with side walls, and with a dam for confining the glass at its normal level, and a sweep mounted for regulated movement between the side walls, and toward the dam for sweeping the glass along the conduit and discharging it in successive regular masses over the dam.

12. The combination, in feeders for molten glass, of a conduit for the glass, provided with side walls, and with a dam lower than the side walls for confining the glass at its normal level, and a sweep or paddle conforming approximately to the side walls of the conduit and mounted for movement between said walls longitudinally of the conduit toward the dam, for advancing the glass along the conduit and discharging it over the dam.

13. The combination, in feeders for molten glass, of a conduit for the glass, a sweep, and regulated means for moving the sweep along the conduit, by one path and returning the sweep by a different path to advance the glass in successive regular masses of wave formation.

14. The combination in feeders for molten glass, of a conduit for the glass, a sweep mounted for movement in and along the conduit, coördinated means for moving the sweep to advance the glass along the conduit and for raising and returning the sweep through a higher path.

15. Means for discharging molten glass from a container, including in combination a sweep mounted for horizontal movement in the container toward one side wall thereof, and means for thus moving the sweep and for returning it to its first position by a different path.

16. Means for discharging molten glass from a container, including in combination a sweep suspended in the glass, and movable horizontally toward a side wall of the container, means for thus moving the sweep toward the side of the container, and means for raising the sweep and returning it to its first position by a different path.

17. A conduit for molten glass, a sweep, means for reciprocating the sweep through the glass in the conduit in different paths, and means for adjusting the lengths of the paths.

18. A conduit for molten glass, a sweep, means for reciprocating the sweep through the glass in the conduit, in varying paths, and means for adjusting the position of the said paths lengthwise of the conduit.

19. A conduit for molten glass, a sweep, means for reciprocating the sweep to carry it through the glass in one path and to return the sweep in a different path, means for adjusting the length of the reciprocating movement of the sweep, and means for adjusting the variance between its forward and return paths.

20. A conduit for molten glass, a sweep, a carriage supporting the sweep and mounted for longitudinal movement, and a carriage supporting yoke mounted for vertical movement for raising and lowering the sweep as it is moved by the carriage.

21. The combination of a conduit for molten glass, a sweep, a sweep-supporting carriage mounted for movement longitudinally of the conduit, a carriage-supporting yoke mounted for vertical movement, means for reciprocating the carriage, and means for raising and lowering the yoke, all arranged and operating to move the sweep along the conduit in one path and to return it to its first position by a different path.

22. The combination of a conduit for molten glass, a protecting hood for the conduit, a sweep projected through the hood into the conduit, and means outside of the hood and conduit for reciprocating the sweep horizontally along the conduit.

23. The combination of a conduit for molten glass, a protecting hood for the conduit, a sweep of refractory material projecting through the hood into the conduit, and sweep mechanism protected by the hood from the heat, and exposed for observation and adjustment, for supporting the sweep and reciprocating it horizontally along the conduit to advance the glass along the conduit and discharge it therefrom.

24. The combination of a conduit for molten glass, a hood inclosing the conduit and confining the heat of the glass, a sweep extending through the hood into the glass, and sweep mechanism outside of and protected from the heat by the hood for supporting the sweep, and moving it laterally, in a path extending lengthwise of the conduit.

25. Means for separating molten glass into mold charges including in combination with a tank or reservoir for the glass, a conduit having its floor below the surface level of the glass in the tank, and provided with a dam having a depending lip, a sweep projecting into the conduit and partially submerged in the glass, and regulated means for moving the sweep lengthwise along the conduit toward and approximately to the dam, for advancing the glass along the conduit in timed successive surges, arranged to draw back the glass from the crest of the dam, as each successive surge hangs from the depending lip, to attenuate the connecting thread of glass, for the purpose specified.

26. The combination of a glass melting furnace in which the glass has a normally clear and unobstructed surface, of a discharge outlet above the general level of such surface, means adjacent to the outlet for causing the discharge of glass from the outlet by raising above the level of the outlet the surface level of a part of the glass immediately adjacent to the outlet, without raising above its normal level the free surface of other parts of the glass more remote from the outlet.

27. The combination with a glass melting furnace having a discharge outlet above the general level of the glass in the furnace, of means adjacent to the outlet for raising above the level of the outlet a portion of the glass between said means and the outlet, without raising the surface level of the rest of the glass in the furnace and mechanism for moving said means toward and from the outlet.

28. The combination with a glass melting furnace having a discharge outlet above the general level of the glass in the furnace, of means for substantially segregating a pool of the glass adjacent to the said outlet, and for horizontally contracting the pool to raise its surface level above the level of the outlet at timed intervals.

29. The combination with a glass melting furnace having a discharge outlet above the general level of the glass in the furnace, of means for substantially segregating a pool of the glass adjacent to the outlet, and mechanism for moving the segregating means toward the outlet to contract the pool horizontally and raise its surface level above the discharge outlet at timed intervals.

30. The combination with a glass melting furnace having a discharge outlet above the general level of the glass in the furnace, of means for substantially segregating a pool of the glass adjacent to the outlet, and mechanism for moving the segregating means toward the outlet to contract the pool in a horizontal direction, whereby its surface level is raised above the level of the discharge outlet.

31. The combination with a glass melting furnace having a discharge outlet above the general level of the glass in the furnace, and having a pool of the glass adjacent to the outlet, of means for contracting the pool horizontally to raise its surface level above the level of the discharge outlet.

In testimony whereof I have signed my name to this specification in the presence of two subscribing witnesses.

KARL E. PEILER.

Witnesses:
 WILLIAM A. LORENZ,
 E. R. ABBOTT.

It is hereby certified that in Letters Patent No. 1,277,254, granted August 27, 1918 upon the application of Karl E. Peiler, of Hartford, Connecticut, for an improvement in "Feeders for Molten Glass," an error appears in the printed specification requiring correction as follows: Page 4, claim 19, strike out lines 95-96 and insert the syllables and words *justing the position of its forward and return paths, lengthwise of the conduit.;* and that the said Letters Patent should be read with this correction therein that the same may conform to the record of the case in the Patent Office.

Signed and sealed this 22d day of October, A. D., 1918.

[SEAL.]

R. F. WHITEHEAD,

*Acting Commissioner of Patents.*